United States Patent
Merciu (10) Patent No.: US 10,344,582 B2
(45) Date of Patent: *Jul. 9, 2019

(54) EVALUATION OF DOWNHOLE INSTALLATION

(71) Applicant: STATOIL PETROLEUM AS, Stavanger (NO)

(72) Inventor: Ioan-Alexandru Merciu, Hommelvik (NO)

(73) Assignee: STATOIL PETROLEUM AS, Stavanger (NO)

( * ) Notice: Subject to any disclaimer, the term of this patent is extended or adjusted under 35 U.S.C. 154(b) by 0 days.

This patent is subject to a terminal disclaimer.

(21) Appl. No.: 15/539,299

(22) PCT Filed: Dec. 21, 2015

(86) PCT No.: PCT/NO2015/050256
§ 371 (c)(1),
(2) Date: Jun. 23, 2017

(87) PCT Pub. No.: WO2016/105207
PCT Pub. Date: Jun. 30, 2016

(65) Prior Publication Data
US 2017/0350231 A1    Dec. 7, 2017

(30) Foreign Application Priority Data
Dec. 24, 2014   (GB) .................................. 1423176.5

(51) Int. Cl.
*G01V 1/50*     (2006.01)
*G01V 9/00*     (2006.01)
(Continued)

(52) U.S. Cl.
CPC .......... *E21B 47/0005* (2013.01); *E21B 33/13* (2013.01); *E21B 49/00* (2013.01);
(Continued)

(58) Field of Classification Search
CPC ...... E21B 33/13; E21B 43/00; E21B 47/0005; E21B 49/00; G01V 1/50; G01V 9/00
See application file for complete search history.

(56) References Cited

U.S. PATENT DOCUMENTS

| | | |
|---|---|---|
| 2,538,114 A | 1/1951 | Mason |
| 3,401,773 A | 9/1968 | Synnott, III |
| (Continued) | | |

FOREIGN PATENT DOCUMENTS

| | | |
|---|---|---|
| EP | 1 505 252 | 2/2005 |
| EP | 1 047 935 | 8/2005 |
| WO | 2014/139593 | 9/2014 |

OTHER PUBLICATIONS

Written Opinion of the International Searching Authority dated Mar. 22, 2016 issued in International Patent Application No. PCT/NO2015/05253.

(Continued)

*Primary Examiner* — James G Sayre
(74) *Attorney, Agent, or Firm* — Wenderoth, Lind & Ponack, L.L.P.

(57) ABSTRACT

A downhole installation includes a first pipe layer, a second pipe layer about the first pipe layer, an annulus between the first and second pipe layers, and a geological formation outside of the second pipe layer. A method for evaluating the downhole installation includes: exciting a flexural wave in the first pipe layer using an angled acoustic transmitter; receiving third interface echo data using a plurality of angled acoustic receivers at different locations along the longitudinal extent of the pipe layers; generating acoustic resonance across the thickness of the first and second pipe layers by use of full waveform excitation; receiving the acoustic response wave field generated by the full waveform; identifying a suitable component of the acoustic response wave field; determining if the material outside the second pipe layer is (Continued)

fluid or solid; and analyzing the third interface echo data to thereby evaluate material conditions in the annulus.

9 Claims, 9 Drawing Sheets (51) Int. Cl.
E21B 33/13 (2006.01)
E21B 43/00 (2006.01)
E21B 47/00 (2012.01)
E21B 49/00 (2006.01)

(52) U.S. Cl.
CPC ............... *G01V 1/50* (2013.01); *E21B 43/00* (2013.01); *G01V 9/00* (2013.01)

(56) References Cited

U.S. PATENT DOCUMENTS

| 4,255,798 | A | 3/1981 | Havira | |
|---|---|---|---|---|
| 6,483,777 | B1 | 11/2002 | Zeroug | |
| 7,149,146 | B2 | 12/2006 | Kuijk et al. | |
| 2006/0198243 | A1* | 9/2006 | Tang | E21B 47/0005 367/35 |
| 2006/0233048 | A1* | 10/2006 | Froelich | E21B 47/0005 367/35 |
| 2007/0131417 | A1 | 6/2007 | Bolshakov et al. | |
| 2007/0206439 | A1* | 9/2007 | Barolak | E21B 47/0005 367/35 |
| 2010/0118649 | A1* | 5/2010 | Zhao | E21B 47/0005 367/35 |
| 2014/0177389 | A1* | 6/2014 | Bolshakov | E21B 47/0005 367/35 |
| 2015/0219780 | A1* | 8/2015 | Zeroug | E21B 47/0005 702/6 |
| 2016/0041287 | A1 | 2/2016 | Merciu | |
| 2017/0350999 | A1* | 12/2017 | Merciu | E21B 47/00 |

OTHER PUBLICATIONS

International Search Report dated Mar. 22, 2016 issued in International Patent Application No. PCT/NO2015/050256.

UK—IPO Search Report dated May 5, 2015 issued in British Application No. GB 1423176.5.

R. van Kuijk et al., "A Novel Ultrasonic Cased-Hole Imager for Enhanced Cement Evaluation." International Petroleum Technology Conference, Nov. 21-23, 2005, Doha, Qatar. IPTC 10546.

A. Timonin et al., "Microannulus and Cement Evaluation: Effectiveness of Cement Evaluation Using Sonic and Ultrasonic Technologies in Wells with Microannulus Between Casing and Cement Sheath" SPE Annual Caspian Technical Conference and Exhibition, Nov. 12-14, 2014, Astana, Kazakhstan. SPE 172309.

* cited by examiner

EVALUATION OF DOWNHOLE INSTALLATION

The invention relates to a method and an apparatus for evaluation of a downhole installation. The invention may be used to assess the quality of the bond for sealing material formed around a downhole casing in an oil and/or gas installation.

In an oil and/or gas production installation cement, as a sealing material, is cast around a downhole casing for various reasons. Other sealing materials can also be found around a downhole casing, such as shale, barite or collapsed formation material. These materials can fall from the walls about the casing and hence form a packed layer. This can occur with or without an associated cement layer.

A primary role of the cement is to seal the formation's pores, blocking the escape of formation fluids inside the well. The cement provides support to the casing, and also forms a barrier around the casing that, if well-bonded, will prevent fluid migration between different zones of the well. For example, it is desirable to prevent fluid (from all sources) from leaking to the surface outside of the casing. It is also desirable to isolate producing zones from water bearing zones and aquifers. Migration of hydrocarbons into aquifers results in a loss of otherwise valuable hydrocarbons and a risk of environmental damage. Water ingress into producing zones can decrease the value of production and could render a producing zone no longer commercially viable. Proper cement placement between the well casing and the formation is therefore highly important. As a consequence, techniques for evaluating the quality of the cement bond are also highly important.

Barrier layers are expected to have the following properties:
Impermeability.
Long term integrity.
Non-shrinking.
Ductile—(non brittle)—able to withstand mechanical loads/impact.
Resistance to chemicals/substances ($H_2S$, $CO_2$ and hydrocarbons).
Wetting, to ensure bonding to the tube/casing (typically steel).

In newer wells with cemented casings the barrier layer will be relatively new cement and there may be a relatively large amount of information available concerning the make-up and the extent of the barrier layer. In older wells the status of the material behind the casing may be completely unknown. The location of the cement might not be accurately recorded and the cement can be deteriorated. There may also be settled barites, shale, collapsed formation materials and so on, as well as mixtures of those materials.

Cement bond evaluation techniques are used to assess the barrier layers in order to derive qualitative or quantitative data regarding one or more of these properties. Typically it is required that the cement should be verified via cement bond log with two independent logging measurements/tools being used. Logging measurements should preferably provide azimuthal data enabling identification of 'channelling'. The cement bong log is a representation of the integrity of the cement job, and generally focusses on whether the cement is adhering solidly to the outside of the casing.

The log is typically obtained from one of a variety of sonic-type tools. A relatively basic evaluation technique uses the variations in amplitude of an acoustic signal traveling down the casing wall between a transmitter and receiver to determine the quality of cement bond on the exterior casing wall. The acoustic signal in this case is generated by the transmitter at a low frequency range (for example 8 to 35 kHz). An acoustic mode, for example, extensional or flexural mode, excited in the body of the casing will travel along and inside the body of the pipe and it will be more attenuated in the presence of cement, or other sealing material about the casing, than if the casing were uncemented. This measurement is largely qualitative, as there is no indication of azimuthal cement variations such as channelling, and as it is sensitive to the effect of a microannulus. Newer systems use higher frequency bandwidths, for example 100 to 700 Khz or over 1 MHz. These are sometimes called cement evaluation logs or ultrasonic evaluation. They can give detailed, 360-degree representations of the integrity of the cement job.

In the prior art various techniques are described that make use of two basic principles to obtain cement bond logs from tools within the casing. One technique, as described in U.S. Pat. No. 3,401,773, uses a logging tool with sonic transducers spaced apart along the extent of the casing. A first sonic transducer insonifies the casing with an acoustic wave that propagates along the casing. The characteristics of the wave along the casing are determined by the geometry of the casing and the elastic wave properties of the casing. A refracted wave is received by a second transducer. The received signal can be processed to determine the presence or absence of cement behind the casing by extracting a particular portion of the received signal. If a solid barrier material such as cement is in contact with the outer of the casing then the amplitude of the acoustic wave propagating along the casing is diminished by a relatively small amount and the energy of the extracted portion of the received signal is relatively small. On the other hand, if a liquid is in contact with the casing, indicating an absence of a barrier material or a poor adhesion of the cement leading to a cavity that can be filled by liquid, then the amplitude of the acoustic wave is far less diminished and the extracted portion of the received signal has a correspondingly increased energy. This is a 'shear coupling' type phenomena. The guided mode energy inside the body of the pipe will be affected in terms of relative energy by the shear coupling in the material behind the pipe. There are two types of acoustic body waves, one is called compressional the second is called share. The two modes exist together as long as the traveling media is solid, but the shear mode does not travel inside fluid environments (water, muds, air and so on).

This type of technique can therefore provide useful information concerning the presence or absence of the barrier material adjacent to an interface between the casing and the annulus. However, it is not sensitive to the size of the void between the barrier material and the casing, and may hence in some cases indicate that there is no barrier material when a material such as cement is present and there is a small spacing between the cement and the casing. Such a 'microannulus' can be acceptable as cement lining with a microannulus may still provide a hydraulic barrier, and therefore it is an advantage to be able to identify an acceptable microannulus as distinct from a larger, unacceptable, spacing.

In another known prior art technique, as described for example in U.S. Pat. Nos. 2,538,114 and 4,255,798, an ultrasonic pulse echo technique is used, whereby a single transducer mounted on a logging tool within the casing is used to insonify the casing at near normal incidence and receives reflected acoustic information. With this arrangement the transducer insonifies the casing in such a way as to prompt resonance across the thickness of the casing. A portion of the acoustic wave is transferred into the casing and reverberates between a first interface at the junction of fluid within the casing and the casing material, and a second interface formed between the casing and the annulus behind the casing. The level of energy loss for this acoustic wave at each reflection changes depending on the nature of the matter (e.g. cement or fluid) behind the casing. It is suggested that this technique can more accurately discriminate different cement bond conditions including identification of acceptable microannuli.

A further prior art technique makes use of angled transducers as shown in U.S. Pat. No. 6,483,777. The angle of the transducer is set to be larger than a shear wave critical angle of the interface between the fluid within the casing and the material of the casing. The transducer therefore excites a flexural wave in the casing by insonifying the casing with an excitation at an angle greater than the shear wave critical angle. This flexural wave propagates along within the casing and sheds energy to the fluid inside the casing and to the material behind the casing. The flexural wave is a shear wave which propagates well in the solid material of the casing, but does not propagate in fluid due to the different molecular conditions. A portion of the flexural wave energy is leaked outside of the casing in the form of a compressional wave, which can propagate within solid or fluid in the annulus of the material outside of the casing. This wave may be refracted or reflected at a third interface, which in U.S. Pat. No. 6,483,777 is an outer boundary of the annulus. An echo is generated at the third interface (the third interface echo, third interface echo) and consequently this method provides additional data concerning the material within the annulus. As a portion of the flexural wave energy leaks into the annulus and reflects/refracts back to the receiver on the tool then this method can obtain data providing information about the entirety of the matter within the annulus, i.e. over an entire distance separating the casing and the third interface. Essentially, it has been shown that the casing is made "transparent" allowing the logging tool to "see" beyond the casing to the material of the annulus.

EP 1505252 describes yet a further prior art logging tool. In this example the logging tool has a plurality of acoustic transducers including a transducer for insonifying the casing with an acoustic wave at an angle, a transducer for insonifying the casing with a wave at normal incidence, and a pair of transducers operated at an angle to receive reflected and refracted waves from the casing as well as from the third interface. The transducers are at different positions along the length of the casing. The device thus includes a flexural transmitting transducer, a pulse echo transducer and two transducers for receiving acoustics generated by the flexural wave, being a near flexural receiving transducer and a far flexural receiving transducer. This technique allows for a greater amount of information to be derived concerning the material in the annulus behind the casing.

An example of the type of tool described in EP 1505252 that can be obtained commercially is an IBC Isolation Scanner as provided by Schlumberger Limited. The use of this tool has been well developed by the industry.

However, there remain issues to address in relation to determination of conditions within a downhole installation, in particular when seeking to measure the condition of the cement, or other material within the annulus about the casing, when there is a sequence of concentric pipes, for example when a tubing has been installed within the casing. Current well integrity logging using ultrasonic and acoustic methods requires logging operations to be performed into a single layered pipe (i.e. target sealing material placed behind one casing wall) and not in dual casing or multiple casing environments.

There are three technologies that are believed to contain information about dual casing or multiple casing environments: Vertical Seismic Profile (VSP), Borehole Acoustic Reflection Surveys (BARS—full waveform sonic logging), and Isolation Scanner—cement bond logs—variable density logs (IBC-USI-CBL).

Some interest has been shown in the past towards evaluation of VSP signals in multiple layers pipes in order to detect formation seismic tops in check shot surveys. In general noisy VSP surveys inside cased hole environments are attributed to a lack of cement to pipe bonding, free pipes (no contact between pipes and surrounding formations) or multiple layer pipes. The presence of such layered media in between receiver and surface source generates a ringing noise and the first arrivals are hard to distinguish automatically by detection algorithms. Manual analysis is possible but gives rise to large errors. Methods for picking VSP first arrivals are known to exist but usually they are kept as trade secrets or they are too unstable to be trusted by industry.

In relation to BARS, since the 1990's new techniques for imaging fractures away from boreholes using sonic logs have been developed using seismic leveraged techniques applied to full waveforms recorded downhole by sonic tools with monopole and dipole transmitters with source bandwidth spanning from about 700 Hz up to around 35 kHz. The processing techniques have reached the peak of development in 2008 and this technique is used currently in open hole environments but it is considered to be a niche technology, with limited amount of expertise developed around the world.

IBC-USI-CBL represent well known logging techniques widely used for single pipe integrity evaluation, one example of which is found in EP 1505252. In basic form these techniques consist of recording waveforms in the ultrasound and sonic domain. The sonic signal is generated traditionally by a monopole source with central bandwidth spanning from 8 kHz to 35 kHz. The pressure impulse will hit the pipe wall at an angle and it produce an extensional guided wave within the pipe wall, radiating headwaves on both sides of the pipe wall. The wave within the pipe wall is a shear wave that will not propagate through fluid material. The headwaves are compressional waves that will propagate through solid and through fluid. The headwaves are recorded by hydrophones/receives placed different distances from source, typically at about 3 ft and about 5 ft. The amplitude of the first break arrival at the received signal, the attenuation and the full waveform is displayed on a log. Specific thresholds are applied to distinguish different material conditions outside of the pipe wall, and one can perform a qualitative nonazimuthal interpretation. Variations of methods exist including azimuthal mapping of attenuation. It has been suggested that this technique can evaluate cement integrity between two casing strings, but to date there has been no proposal of the use of this type of system to make an assessment of conditions outside of a second casing in a multiple casing system. The current invention seeks to address the need for such an assessment.

Viewed from a first aspect, the present invention provides a method of evaluation of a downhole installation, wherein the downhole installation comprises: a first pipe layer, a second pipe layer about the first pipe layer, an annulus between the first pipe layer and the second pipe layer, and a geological formation outside of the second pipe layer, the method comprising:

exciting a flexural wave in the first pipe layer using an angled acoustic transmitter;

exciting the first pipe layer and the second pipe layer with full waveform excitation;

thereby generating Lamb wave vibrations in both the first pipe layer and the second pipe layer;

receiving third interface echo data using a plurality of angled acoustic receivers at different locations along the longitudinal extent of the pipe layers;

receiving the acoustic response wave field generated by the Lamb wave excitation;

identifying a suitable component of the acoustic response wave field as being representative of the material state behind the second pipe layer;

determining, based on the amplitude of the identified component and a suitable threshold value, if the material outside the second pipe layer is fluid or solid; and analysing the third interface echo data in light of the determined material state in order to thereby evaluate material conditions in the annulus outside the second pipe layer.

This method makes use of the known third interface echo phenomena and expands on this to allow for further information to be obtained about material conditions outside of the third interface.

It has been found that the third interface echo, in the case of a two pipe layer system, is not necessarily a reflection as has been previously suggested. Instead it may be considered to be energy arising due to a headwave generated by a flexural wave inside the second pipe. As used herein, the term third interface echo denotes the third 'echo' (the third peak in amplitude received by a receiver) which appears as being received from a third interface counting from the source outward towards the formation. In the two pipe system of the first aspect, the first interface is the inside face of the first pipe layer, the second interface is the external face of the first pipe layer, the third interface is the internal face of the second pipe layer, the fourth interface is the external face of the second pipe layer, and the fifth interface is a subsequent formation boundary or possibly the internal face of a subsequent casing/pipe layer.

One reason for the use of the flexural wave is for light cements and foam cement evaluation. Those particular cements are used in complex wells, such as ultradeep high pressure and high temperature wells, because they are much stable. They have impedance characteristics below 3.9 MRayl, which is recognized as a critical impedance. The conventional vertical incidence ultrasonic will generate an extensional mode (balloon, A0) in the body of the pipe. This is an asymmetric mode of vibration. The impedance characteristics of the contact between the pipe and sealing material will be affected in terms of relative values and the light cement may look like fluids because there is not enough shear coupling.

By exciting shear mode/flexural or zeroth symmetric mode in the body of the pipe (like a belt vibration, S0), then there is a shear to pressure conversion in the material behind the pipe, so we are confident that attenuation of the shear is dictated by the pressure coupling and not shear coupling. The excitation of S0 (zeroth symmetric mode or flexural) in the first pipe layer enables the first pipe layer to act as a source of pressure/compressional waves (P waves). While the S0 travels along the body of the pipe it will continually "leak P" on both sides of the pipe.

The material conditions that are evaluated by the method might typically be cement bond log data, for example a determination of the nature of the bond of a sealing material, such as cement, to the outer casing in an oil and gas wellbore. As explained in detail herein, the inventor has made the realisation that the third interface echo data by itself does not allow for assessment of the material conditions since there is a discontinuity that cannot be resolved without knowledge of the material state behind the second pipe layer. This problem has been addressed by the non-obvious use of selected components of an acoustic wave field generated by means of full waveform acoustic excitation in combination with excitation of a flexural wave via an oblique wave front. The combination of excitations results in Lamb waves in both the first and second pipe layers. It has been found that the amplitude of certain components of the resulting acoustic wave field provides an indication of the material state (fluid or solid) behind the second pipe layer, and this therefore allows for the problematic discontinuity to be resolved since it becomes possible to determine what side of the discontinuity is relevant.

The target annulus is typically the annulus outside of the second pipe layer, but it will be appreciated that the method could be extended to also provide evaluation of systems with additional pipe layers, for example three or four pipe layers, where a target annulus is outside of these additional layers. The same process that leads to creation of a third interface echo for a two-pipe system will also generate higher order interface echoes for systems with more layers of pipe, and these echoes can be identified and analysed in a similar way to thereby 'see' through the second pipe layer to a third pipe layer, and so on.

The step of generating acoustic resonance across the thickness of the first pipe layer and the second pipe layer by use of full waveform acoustic excitation may include the use of one or more of ultrasonic pulse echo measurements with a near normal incidence on the pipe wall, full borehole acoustic mode measurement performed with a Sonic Scanner tool, or equivalent, and/or full borehole acoustic mode measurements using dipole and monopole source over a suitable frequency range, such as from 700 Hz to 35 kHz.

The step of identifying a suitable component of the acoustic response wave field as being representative of the material state behind the second pipe layer may include identification of a number of the most energetic components of the wave field and selecting a suitable component. Preferably, a component is selected that is generated by the reaction of the most reflective material in the installation, i.e. the material outside of the outer pipe layer. The component may be selected as being a component generated by extensional vibration (ballooning) of the outer pipe layer, which may be the second pipe layer. In one example, the third most energetic component is selected. This may be the component known in the field as the Stoneley wave.

In preferred embodiments, the acoustic data from the third interface echo and full waveform measurements is analysed in order to obtain some or all of the following: azimuthal ultrasound radii and eccentricity, azimuthal amplitude map at the near receiver, azimuthal amplitude map at the far receiver, attenuation for the third interface echo, the arithmetic mean of azimuthal amplitudes of the third interface echo, amplitudes of the five most energetic components of the acoustic wave fields, phase velocities of the five most energetic components of the acoustic wave fields, azimuth of the five most energetic components of the acoustic wave fields. This information can be used to provide the user with significantly greater knowledge of the downhole conditions and the nature of the material in the annulus outside of the second pipe layer (or indeed outside of subsequent pipe layers).

In order to obtain the required third interface echo and full waveform data a suitable logging tool, or tools may be used. Thus, the acoustic transmitter and receivers may be a part of a logging tool. A second logging tool or the same logging tool may include the acoustic source, or sources, for obtaining the full waveform data.

An example logging tool for obtaining the third interface echo data includes an angled transmitter for insonifying a flexural wave in the first pipe layer, along with a near flexural receiver and a far flexural receiver for receiving reflected and/or refracted waves generated by the flexural wave. The near and far flexural receivers may be angled receivers spaced apart from the transmitter by different distances in the depth direction of the pipe layers, that is to say, the near and far receivers are spaced from the transmitter along the axis of the tool that is, in use, aligned with the depth direction of the pipe layers. As is known, the transmitters and receivers may be transducers. Also as is known, the tool may be arranged to rotate within the first pipe layer to thereby obtain multiple sets of readings at differing azimuthal angles for each depth. Optionally the tool may include a pulse echo transducer arranged to insonify the first pipe layer with near normal incidence. This can enable the tool to obtain additional data concerning the annulus between the first pipe layer and the second pipe layer.

The same tool, or a second logging tool, may include appropriate transducer(s) for the full borehole acoustic mode measurement.

The method may advantageously be used to assess the quality of the bond for cement formed around a downhole casing in an oil and/or gas installation.

It will be appreciated that the steps relating to processing of the acoustic data may be carried out at a different time and in a different place to the steps concerning obtaining the acoustic data.

The method may be implemented by means of computer software for processing data obtained by a suitable logging tool or tools.

Thus, the invention extends in a further aspect to a computer programme product comprising instructions that, when executed, will configure a computer apparatus to implement a method comprising:

receiving acoustic data for a downhole installation that comprises: a first pipe layer, a second pipe layer about the first pipe layer, an annulus between the first pipe layer and the second pipe layer, and a geological formation outside of the second pipe layer;

wherein the acoustic data comprises third interface echo data received by a plurality of angled acoustic receivers at different locations along the longitudinal extent of the pipe layers and resulting from an acoustic wave oblique to the first pipe layer, and the acoustic data also comprises an acoustic response wave field generated by Lamb wave vibrations of the first pipe layer and the second pipe layer, the Lamb wave vibrations being obtained by use of full waveform acoustic excitation along with the oblique acoustic wave;

identifying a suitable component of the acoustic response wave field as being representative of the material state behind the second pipe layer;

determining, based on the amplitude of the identified component and a suitable threshold value, if the material outside the second pipe layer is fluid or solid; and analysing the third interface echo data in light of the determined material state in order to thereby evaluate material conditions in the annulus outside the second pipe layer.

The method implemented by the computer programme product may include any or all features as described above in relation to the method of the first aspect and its preferred features. The method may be a method of cement bond evaluation for a downhole installation.

In a yet further aspect, the invention also provides a system for evaluation of a downhole installation, wherein the downhole installation comprises: a first pipe layer, a second pipe layer about the first pipe layer, an annulus between the first pipe layer and the second pipe layer, and a geological formation outside of the second pipe layer, the system comprising:

a logging tool or tools for deployment within the first pipe layer in order to excite a flexural wave in the first pipe layer using an angled acoustic transmitter, receive third interface echo data using a plurality of angled acoustic receivers at different locations along the longitudinal extent of the pipes, generate Lamb wave vibrations across the thickness of the first pipe layer and the second pipe layer by use of full waveform acoustic excitation along with the excitation from the angled acoustic transmitter, and receiving the acoustic response wave field generated the Lamb wave vibrations; and a processor arranged to, based on the third interface echo and response wavefield:
  identify a suitable component of the acoustic response wave field as being representative of the material state behind the second pipe layer;
  determine, based on the amplitude of the identified component and a suitable threshold value, if the material outside the second pipe layer is fluid or solid; and
  analyse the third interface echo data in light of the determined material state in order to thereby evaluate material conditions in the annulus outside the second pipe layer.

The invention extends to a downhole installation equipped with the system. The system may be a cement bond evaluation system for a downhole installation. In one example, the first pipe layer is a tubing within a second pipe layer in the form of a casing and the acoustic data is used to determine information about the material outside of the casing.

The processor of the system may be arranged to perform any or all steps described above in relation to the method of the first aspect. The processor may be located onboard the logging tool, or it may be located remotely, for example it may be a processor above ground close to or remote from the downhole installation/logging tool.

The logging tool may be arranged for deployment within the first pipe layer via wireline or via a logging whilst drilling (LWD) system.

In some example embodiments, the logging tool includes a transmitter for exciting the flexural wave in the first pipe layer for obtaining the third interface echo. One possible tool includes an angled transmitter for insonifying a flexural wave in the first pipe layer, along with a near flexural receiver and a far flexural receiver for receiving reflected and/or refracted waves generated by the flexural wave. As is known, the transmitters and receivers may be transducers. Also as is known, the tool may be arranged to rotate within the first pipe layer to thereby obtain multiple sets of readings at differing azimuthal angles for each depth. Optionally the tool may include a pulse echo transducer arranged to insonify the first pipe layer with near normal incidence. This can enable the tool to obtain additional data concerning the annulus between the first pipe layer and the second pipe layer. The tool could for example be similar to that described in EP 1505252.

The same tool, or a second logging tool, may include appropriate transducer(s) for the full borehole acoustic mode measurement.

Certain preferred embodiments of the invention will now be described by way of example only and with reference to the accompanying drawings in which:

FIGS. 3a to 3h show a modelled dual-pipe system with simulated acoustic waves generating third interface echo data that is received by near and far receivers;

Figure 1:
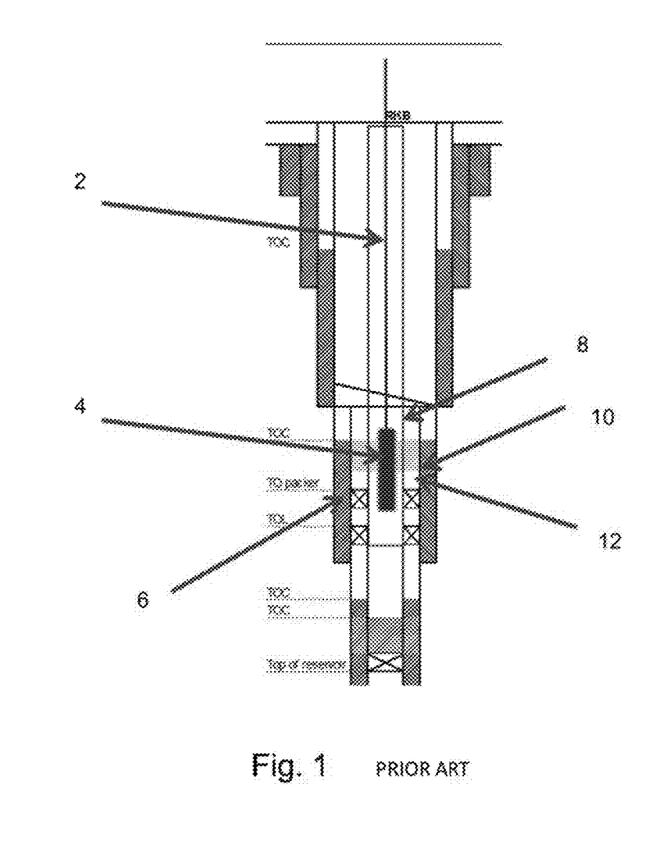
FIG. 1 shows a casing bond logging recording system in situ within a tubing.

A typical downhole installation is shown schematically in FIG. 1. The borehole extends from surface level down to a reservoir. Fluid is extracted from the reservoir through downhole tubing 8. The tubing 8 is held within a casing 10. An annulus 12 is formed between the tubing 8 and the casing 10. There is also another annulus 6 formed between the outside of the casing 10 and the formation, or optionally between the outside of the casing 10 and yet further casings. In this example we consider the simplest case of a tubing 8 within a casing 10. The interior of the tubing 8 and the annulus 12 between tubing 8 and casing 10 are filled with fluid, typically in the liquid phase. The annulus 6 between casing 10 and the formation may be filled with any type of material, such as cements, barite, drilling fluids and so on.

Figure 2:
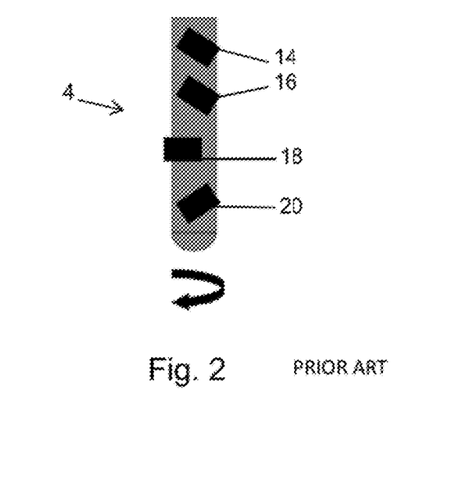
FIG. 2 illustrates details of the wireline logging tool in FIG. 1.

A wireline logging tool 4 is deployed inside the tubing. It is supported from above via a wireline logging cable 2. It will be appreciating that the logging tool 4 could also be deployed via a "logging while drilling" (LWD) system. The wireline logging tool 4 is shown in FIG. 2 in schematic form. The tool 4 is arranged for rotation about the vertical axis of the borehole as shown by the arrow at the base of the Figure. In its most basic form a suitable tool includes an angled transmitter transducer 20 for insonifying a flexural wave, a pulse echo transducer 18, a near flexural receiver transducer 16 and a far flexural receiver transducer 14. Thus, it will be understood that this tool could be broadly similar in terms of its structural features to the tool described in EP 1505252. The basic operation of the tool is already known, and could again be as described in this prior art reference, and therefore it will not be set forth in detail herein. The inventor proposes a new use of this type of tool, and similar tools, in order to evaluate the cement bond quality about a casing when the tool is located within a tubing inside the casing, or within other dual-casing or multiple-pipe installations. This provides a significant advance compared to known systems, since it means that the cement bond log can be obtained more cheaply and more easily.

It is accepted by industry that a third interface echo (TIE) can be obtained via a tool of the type shown in FIG. 2. Various prior art has shown the use of this phenomenon to obtain data about the material in an annulus outside of a casing, when the tool is within the casing. As explained above, it is believed that the third interface echo is not purely an echo as such and therefore it becomes possible to draw new conclusions about the second pipe layer, and the surrounding material. In the current proposal, as shown in FIG. 1, the tool may be within a tubing 8 that is itself within a casing 10. Here, it is desirable to be able to obtain information about the material in the annulus, and in particular to obtain cement bond logging information, by use of the tool to "see" through both of the tubing 8 and the casing 10.

It has been found via simulation that the full waveform obtained through methods such as USI, Oblique Incidence Ultrasonic logging and Sonic Borehole Acoustic Reflection Survey will include information about conditions outside of a second pipe layer such as the casing 10 in FIG. 1. FIGS. 3a to 3h show the simulated reaction of a double pipe layer system. The simulation uses pitch catch ultrasonic elements consisting of one transmitter with frequency bandwidth in the range of 80 to 500 kHz with maximum magnitude of impulse at 100 kHz or 175 kHz or 200 kHz or 250 kHz or 265 kHz or 300 kHz and two receivers for near and far capture of the resultant waveform. The simulation uses a model similar to the set-up described above for FIG. 1. In FIGS. 3a through 3h a half of the downhole installation is modelled and is shown in a section view cutting through the various pipe layers along a radius. The left-to-right direction in FIGS. 3a through 3h is an up and down direction as viewed in FIG. 1. The ultrasound transducers are similar to those shown in FIG. 2 and hence have the same reference numbers.

Thus, within a first pipe layer (such as tubing) 8 a tool is placed (not shown in full), the tool having an angled transmitter 20 along with a near flexural receiver 16 and a far flexural receiver 14. Outside of the first pipe layer 8 is a second pipe layer 10, and there is an annulus 12 between the first pipe layer 8 and second pipe layer 10. Outside of the second pipe layer 10 there is another annulus 6 and this has a boundary 22 formed for example by a formation boundary or by another pipe layer.

In the case of multiple pipe layers of this type the annulus 12 between the first pipe layer 8 and second pipe layer 10 will be filled with a fluid. When using oblique ultrasound incident through tubing logging in this situation it is found that the third interface echo is always visible, for the following reasons:

a. The material in the annulus 12 behind the first pipe 8 is in the fluid state and hence readily transfers energy leaked from the flexural wave in the pipe material.

b. The angle of the pipe layers 8, 10 relative to each other varies very little with distance even if the pipes are buckled. This means that for a logging measurement at a given depth the pipes 8, 10 can be considered as being parallel with each other, as shown in the model.

c. The internal face of the second pipe layer 10 is smooth.

Figure 3A:
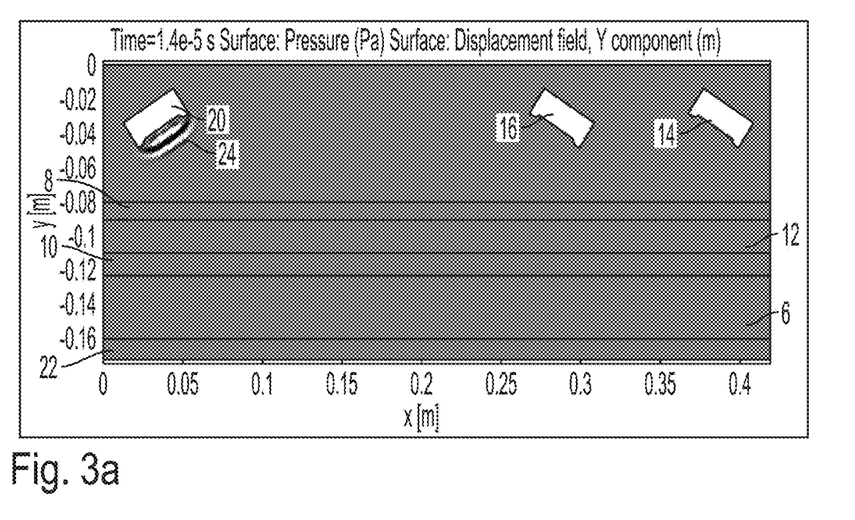

This means that the third interface echo can be utilised reliably for making an assessment of the condition of the annulus 6 behind the second pipe layer 10. The interaction of the acoustic signal from the transmitter 20 and the modelled multi-pipe system is shown in FIGS. 3a to 3h and proceeds as follows:

FIG. 3a: the model is 'at rest', and a pressure impulse 24 is generated by the transmitter 20. The pressure impulse 24 is directed at the first pipe layer 8 at an angle sufficient to generate a shear wave (flexural wave) in the material of the pipe layer 8.

Figure 3B:
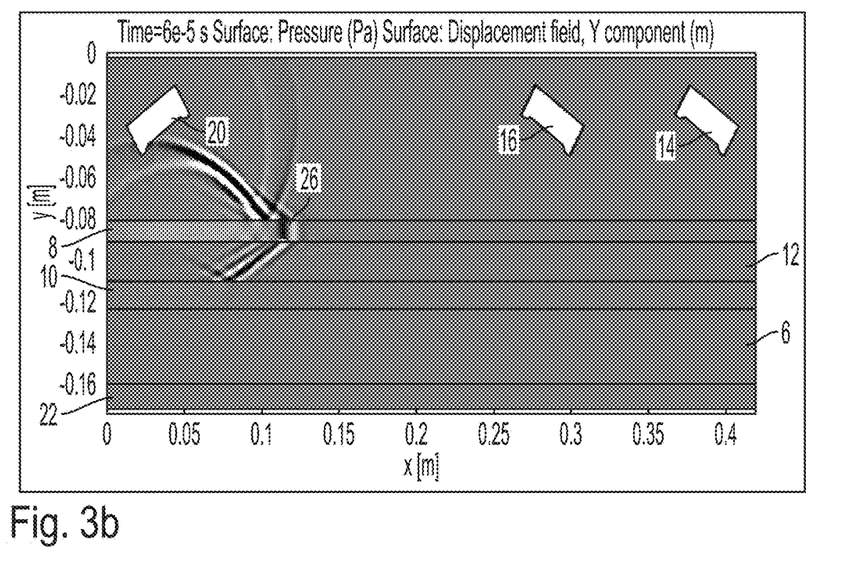

FIG. 3b: When the pressure impulse 24 reaches the first pipe 8 then a flexural wave 26 is excited in the body of the first pipe 8.

Figure 3C:
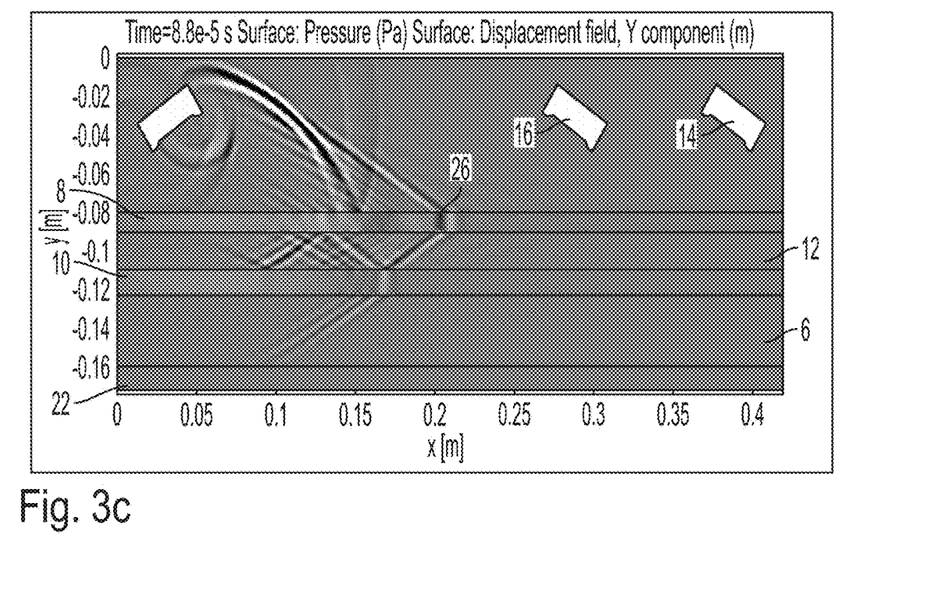

FIG. 3c: This flexural wave 26 is guided along the pipe wall and 'leaks' energy into the material within the first pipe 8 and into the material of the annulus 12 between the first pipe 8 and second pipe 10.

Figure 3D:
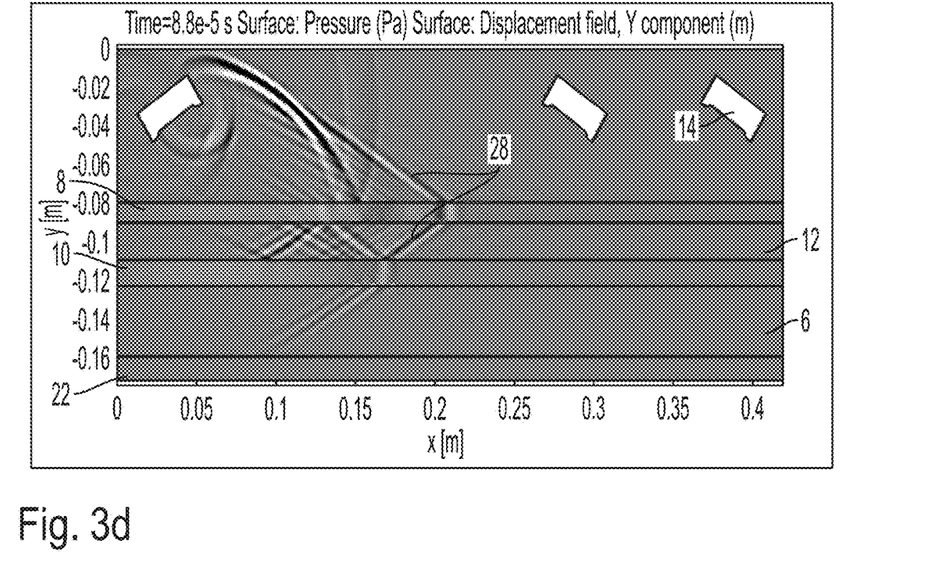

FIG. 3d: The leaked energy generates compressional planar impulse waves 28 ('headwaves') on both sides of the wall of the first pipe 8.

Figure 3E:
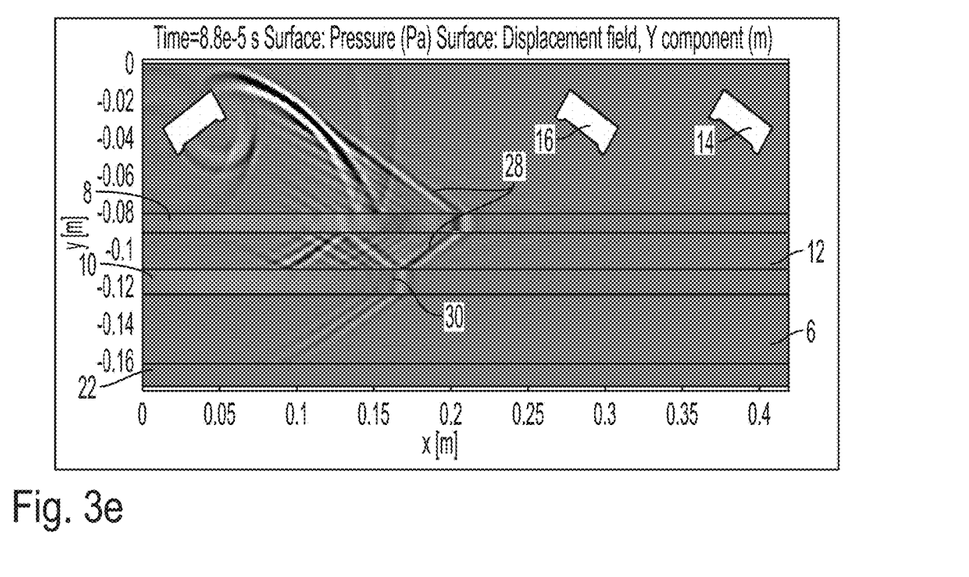

FIG. 3e: The angle of incidence of the compressional wave 28 on the second pipe layer 10 is similar to the angle of incidence of the initial excitation signal and hence is able to excite a second flexural wave 30 in the wall of the second pipe layer 10.

Figure 3F:
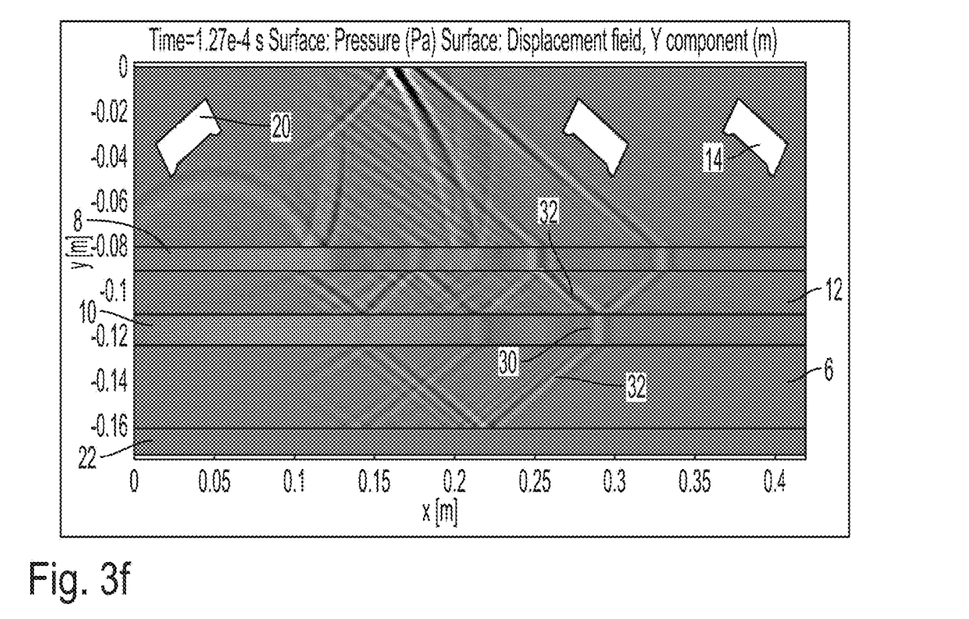

FIG. 3f: As the two flexural waves 26, 30 proceed along the pipe layers then second flexural wave 30 traveling inside the wall of the second pipe 10 will leak energy in similar way as the first flexural wave 26 and this produces a further set of compressional planar impulse waves 32 centred on the second pipe layer 10.

Figure 3G:
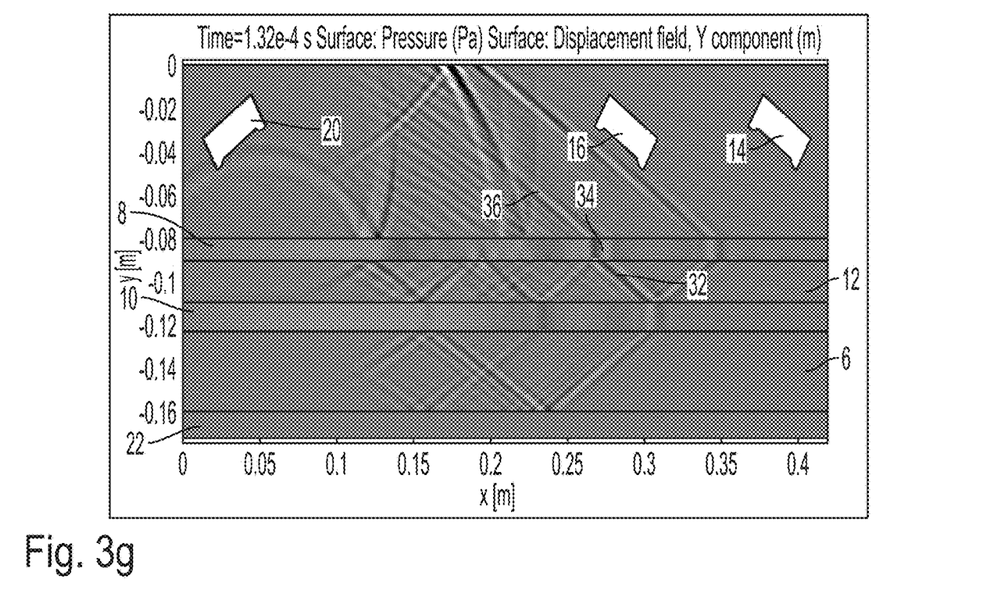

FIG. 3g: The further set of compressional planar impulse waves 32 includes a wave that passes through the annulus 12 back to the first pipe layer 8 and excites a third flexural wave 34 therein. This then leaks energy to produce additional compressional waves, of which the wave within the inner pipe forms the third interface echo 36.

Figure 3H:
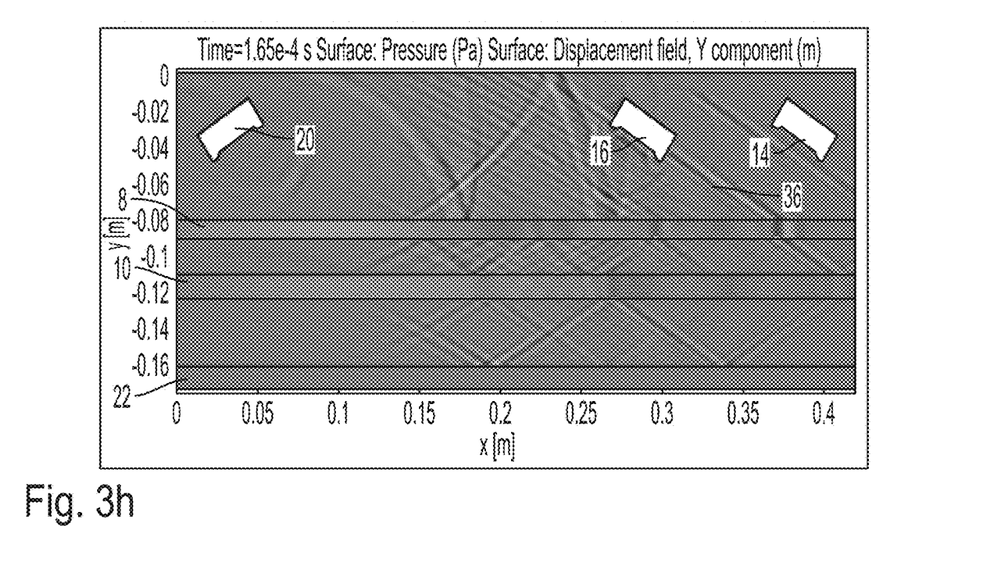

FIG. 3h: The third interface echo 36 will pass the near receiver 16 and then the far receiver 14, where it can be recorded as a part of the full wave form.

Figure 4:
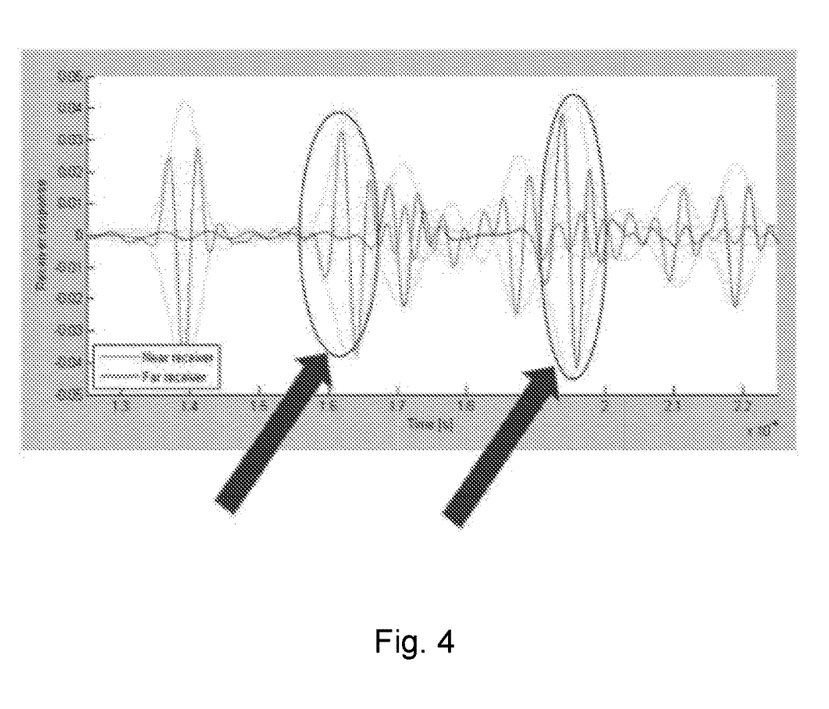
FIG. 4 is a graph of received acoustic amplitude at the near and far receivers of FIGS. 3a-3h.

The resultant waveform is shown in FIG. 4 with the readings from the near and far receivers overlaid. The near receiver sees the third interface echo 36 starting at about 0.16 ms on the time axis as shown by the first arrow. The far receiver sees the third interface echo 36 at about starting at about 0.19 ms on the time axis as shown by the second arrow. The amplitudes of the third interface echo plotted azimuthally will provide information about the material body of the second pipe layer 10 and the bonding status of the second pipe layer 10. Notably, and surprisingly, the amplitude of the third interface echo is larger at the far receiver than at the near receiver.

It is generally known that the material within the first pipe layer 8 and within the second pipe layer 10 (in the annulus 12) is in the fluid state. The material outside of the second pie layer 10 (in the annulus 6) could be fluid or solid. By considering the possibility of either a fluid material in the annulus 6 or a solid material in the annulus 6 then synthetic seismograms can be obtained. It is possible to extract the amplitudes of third interface echo at the far receiver 14 and near receiver 16, to calculate attenuation of the flexural mode inside the body of the second pipe layer 10 and to find distances in between pipes.

Figure 5:
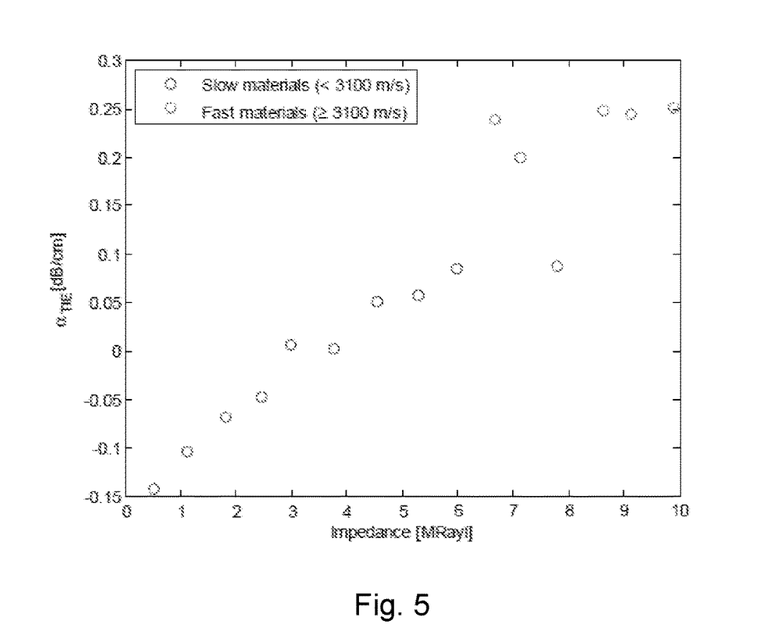
FIG. 5 shows attenuation of the flexural wave in the second pipe layer of FIGS. 3a-3h when the material behind the pipe is in the fluid state.
Figure 6:
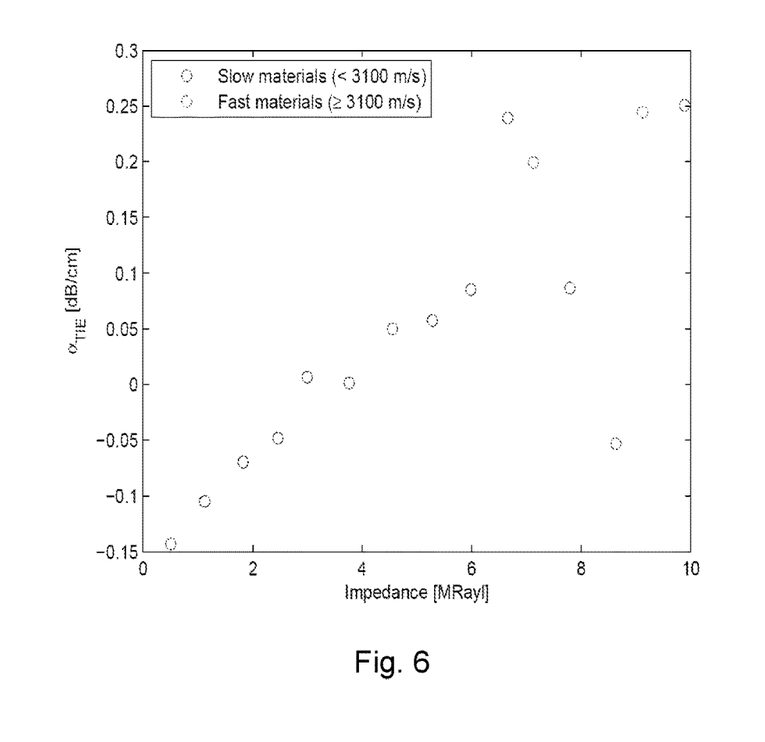
FIG. 6 shows attenuation of the flexural wave in the second pipe layer of FIGS. 3a-3h when the material behind the pipe is in the solid state.

FIG. 5 shows the attenuation of flexural mode in the second pipe layer 10 as function of impedance of material behind second pipe when the martial behind second pipe is in the fluid state and FIG. 6 shows the equivalent attenuation of flexural mode in the second pipe layer 10 as function of impedance of material behind second pipe when the martial behind second pipe is in the solid state. It will be seen that these Figures are similar, indicating that the attenuation does not provide a way to distinguish between solid and fluid materials.

Figure 7:
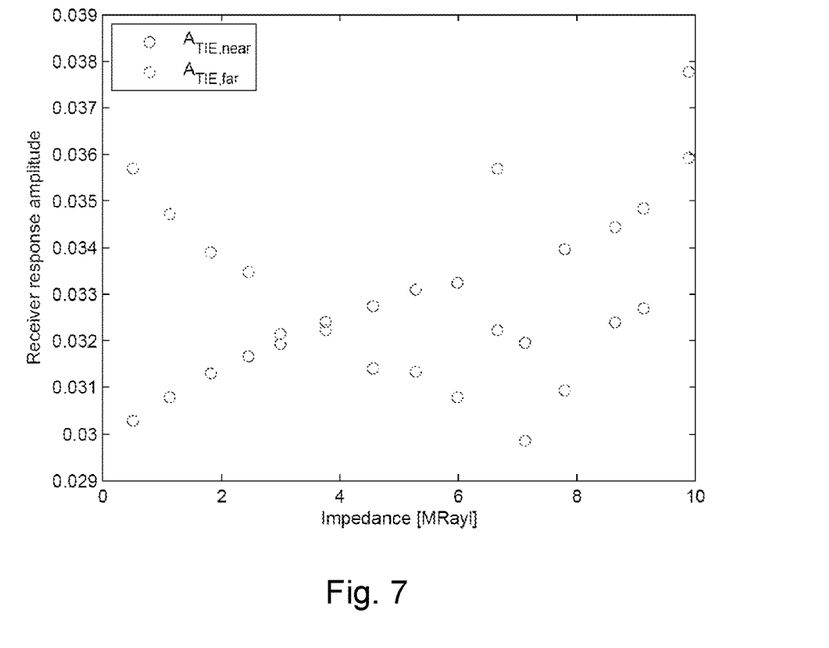
FIG. 7 is a plot of third interface echo amplitudes at the near and far receivers as a function of impedance of the material behind the second pipe for solid state material.
Figure 8:
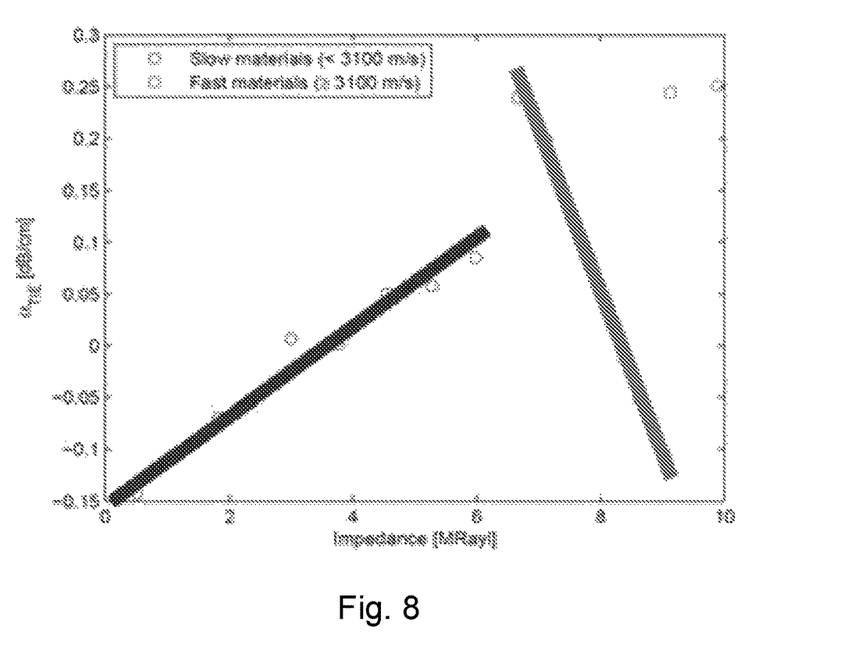
FIG. 8 illustrates the non-linear behaviour of third interface echo attenuation for the second pipe layer and shows a discontinuity.

More information is seen when the third interface echo amplitudes at the two receivers are plotted as function of the impedance of the material behind second pipe. FIG. 7 shows the results for this when the material behind second pipe is in the solid state. Considering FIG. 7 it will be observed that there is a crossing of the amplitude values at an impedance value of about 4 MRayl. This corresponds with transition of mode coupling behind the second pipe from dominant P mode coupling to dominant share mode coupling. FIG. 8 depicts the non-linear behaviour of the third interface echo amplitudes when plotted against impedance.

Hence, a problem arises. It is not known if the material in the annulus 6 beyond the second pipe layer 10 is fluid or solid and therefore it is not possible to determine what side of the discontinuity of FIG. 8 is relevant. In fact, part of the reason for investigating the information inherent in the third interface echo is to identify the properties of this material. Without knowledge of the material state it is impossible to define the impedance of the material behind the second pipe layer 10 by using only the headwaves generated by the flexural waves and the associated third interface echo amplitudes and third interface echo attenuation on the second pipe layer 10. This observation is the same observation as has previously been made for a single pipe bonding evaluation. In the case of a single pipe the situation can be resolved by an independent measure of impedance, such as the use of an ultrasonic pulse echo technique as discussed above. In order to make effective use of the third interface echo data discussed above to find information about material conditions beyond a second pipe layer additional measurements must be carried out in order to identify what side of the discontinuity of FIG. 8 should be considered for a given third interface echo based measurement, or at least to predict this with a high degree of confidence.

For a single pipe layer the traditional method of measuring the impedance behind one layer of pipe implies isonifying the target with and vertical ultrasonic incident beam at resonant frequency of the pipe. It is accepted that very little energy will be transmitted in the body of the material behind one layer of pipe, approximatively 10 from the incident energy.

Therefore, lower frequencies are to be considered for estimation of bonding/nonbonding conditions behind the pipe. In the case of a dual casing or through tubing logging the full wave form sonic records will have higher energy components when there is no bonding or solid sealing material behind the last target (layer) for investigation comparing with the energy of same component when there is a bonded situation. It has been found that by a combination of excitation via an oblique acoustic wave (as described in relation to FIGS. 3a-3h) and excitation by full acoustic waveform it is possible to generate Lamb wave vibrations in both the first pipe layer and the second pipe layer. The wave field resulting from the Lamb waves will provide information about conditions behind the second layer. A similar principle applies to multiple casing logging having more than two layers, with bonding material outside the last target.

In order to develop a scheme for differentiating between fluid and solid conditions beyond the final pipe layer, it is instructive to consider a dual casing environment/through tubing environment as described in FIG. 1 modelled as shown in FIGS. 3a to 3h when excited with a broad band acoustic wave form. If a broad band monopole acoustic source with frequency bandwidth from 0 to 100 kHz is used within the first pipe layer, then the received acoustic data will have various components at different energy levels corresponding to acoustic reactions from the various pipe layers, from the various interfaces between the pipe layers and the annulus material, and from different modes of vibration (e.g. flexural, extensional and so on). If the material in the annulus of interest is solid, then the amplitude of relevant components of the wave filed will be lower than if the material in the annulus of interest is fluid. The reason for this is that a solid will provide relatively large damping resisting resonance of the pipe layer of interest, whereas a fluid will provide reduced damping. This means that a method can be devised for identifying whether the material of interest is solid or fluid. It is necessary to identify the correct component of the acoustic wave field, and to then set a threshold value for amplitude at that frequency.

What is of most interest is the component of the acoustic wave field that relates to the reaction of the relevant pipe layer (the second pipe layer, or potentially the outermost pipe layer in a system with more than two layers). This would generally be the pipe layer with the most reflective interface, and also would generally be the component of the wavefield produced by extensional vibration (ballooning) of that pipe layer. As described below, in one example this is the third most energetic component of the wave field. It is considered that in a two pipe system the first most energetic component relates to extensional vibration (ballooning) of the first pipe layer, the second most energetic component relates to shear coupling for the first pipe layer, the third most energetic component relates to the extensional vibration for the second pipe layer (and hence is the component of interest) and the fourth most energetic component relates to shear coupling for the second pipe layer. The fifth most energetic component could arise from a number of sources, depending on the system concerned.

Thus, the amplitude of (in this example) the third energetic component of the total recorded wavefield in sonic domain will provide information about the impedance at the third interface. The total energy and attenuation of this component can be used for defining the type of coupling behind second pipe, in the sense that when more shear coupling exists behind the second pipe then the lower the amplitudes of the recorded third most energetic component.

The isonification of the target by the full acoustic mode waveform is made by a cylindrical wave with maximum energy towards the center of the cylinder and so the incoming wave can be considered at low incidence angles. A symmetric S0 mode hence will be excited in the first pipe and it will travel and leak P on both side of the pipe as a headwave. This mode is called extensional mode. It will be followed by flexural mode A0. This will mode will also leak P on both sides of the pipes. Subsequently the leaky P from S0 in the first pipe layer will travel in the annuli space and it will excite another S0 mode in the body of the second pipe, which will leak P on both sides of the second pipe and will be followed by a flexural mode. The same phenomena will be triggered by the A0 mode in the second pipe at lower speeds. Thus the first four most energetic components can be readily associated with a given mode of vibration in the first pipe layer or the second pipe layer. By the fifth most energetic component (or sometimes even the fourth) things are more complex and it is not possible to make a general pronouncement on what this might represent.

It is natural to think in the time domain: the first most energetic component will correspond to A0 mode in the first pipe, second most energetic component to S0 in first pipe, and third most energetic component to A0 in the second pipe.

The threshold value or values for amplitude of the selected component should be set so that they differentiate between fluid and solid and generally there will be a higher amplitude value, above which the pipe is deemed as a 'free pipe', i.e. no solid material in the annulus, and a lower amplitude value, below which the pipe is considered to be a 'bonded pipe', with solid material in the annulus adjacent the pipe. This can be done based on past experience, based on experimental or laboratory data, or based on multiple-pipe measurements where the target annulus material is known for other reasons (for example from earlier single pipe measurements).

In order to obtain the required acoustic wave field to find the relevant component to set a threshold it is necessary to obtain a full waveform using a suitable technique. Possible techniques include full borehole acoustic mode measurements (for example using a Sonic Scanner tool or similar) or full borehole acoustic mode using a dipole and monopole source with a large frequency range, for example 700 Hz to 35 kHz.

Figure 9:
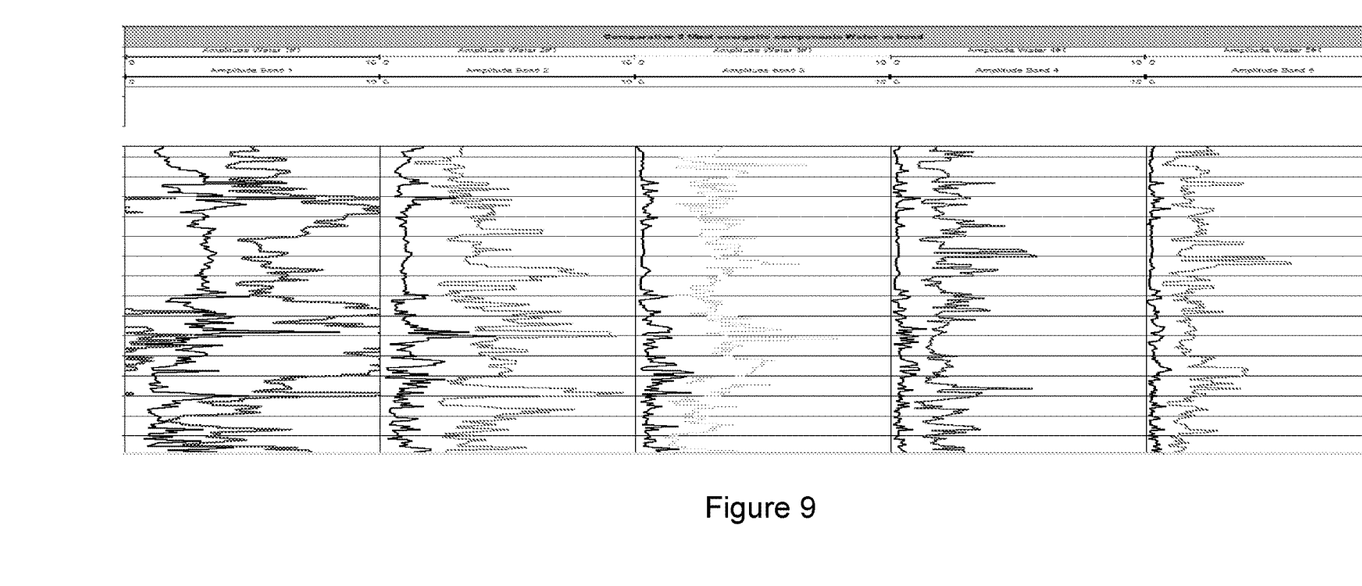
FIG. 9 shows a representation of the five most energetic components of a wavefield obtained via full waveform acoustic measurement of a dual casing system.

In a preferred example, the first step is to record downhole data at the interval(s) of interest using the following combination of measurements at the same depths and with the same conditions (either at the same time as mentioned above, or at different times if simultaneous measurement is not possible):
  ultrasonic vertical incidence (for example Isolation Scanner, FIG. 2 device, or equivalent)
  ultrasonic oblique incidence (for example Isolation Scanner, FIG. 2 device, or equivalent)
  full borehole acoustic mode measurement (performed with Sonic Scanner tool, or equivalent)
  full borehole acoustic mode measurement using dipole and monopole source spanning frequencies from 700 Hz to 35 kHz The recorded data should then be processed in order to enable the following information to be displayed:
  azimuthal ultrasound radii and eccentricity
  azimuthal amplitude map at the near receiver
  azimuthal amplitude map at the far receiver
  attenuation for the third interface echo
  the arithmetic mean of azimuthal amplitudes of the third interface echo
  amplitudes of the five most energetic components of the acoustic wave fields
  phase velocities of the five most energetic components of the acoustic wave fields
  azimuth of the five most energetic components of the acoustic wave fields A second step is carried out in order to determine the material type behind the target layer. First, it is necessary to select the relevant component of the wave field and to apply a suitable threshold. In the example of a dual casing as shown in FIG. 1 and as modelled in FIGS. 3a to 3h then the peak of interest has been found to be the third most energetic component. This may be the component known in the field as the Stoneley wave. FIG. 9 shows a plot of the five most energetic components of the acoustic wave fields measured with a technique as described above. The amplitude increases from left to right in each panel and the energy level for the component is higher for the left hand panel decreasing toward the right hand panel. The left-hand line in each panel is for a solid material in the target annulus and the right-hand line in each panel is for a fluid (water in this example). It will be seen that the third most energetic component provides a reliable way to differentiate between fluid and solid. In the example given we can set thresholds at 1 and 3 units. Below 1 there is considered to be a fluid in the target annulus, or that the target layer is a 'free pipe'. Above 3 there is considered to be a solid in the target annulus.

The third step is to analyse the third interface echo data. When the third most energetic component is above the lower threshold then the third interface echo map can be analysed in accordance with Table 1 below and based on FIG. 8. It is now known that in FIG. 8 the left hand side of the discontinuity should be used as the basis for further analysis.

TABLE 1

| Z MRayl | Flex att | Material |
|---------|----------|----------|
| 0.1-0.8 | −0.15 −> −0.12 | Gas |
| 0.8-2 | −0.12 −> −0.06 | Fluid |
| 2-4 | −0.06 −> −0.02 | Foam/LC |
| 4-8 | −0.02 −> 0.3 | Cement |

Using FIG. 7 as a basis it is then possible to analyse and combine all of the amplitude maps for the near and far receivers. This means that it is possible to derive an accurate indication of the condition of the material in the annulus outside of the second pipe layer. For example, a cement bond log can be obtained.

As a further step, when the third most energetic component is below free pipe threshold, then it is possible to analyse and combine all amplitude maps for the near and far receivers aside from the attenuation map.

Based on the data obtained using these techniques, the following information can be provided for a downhole oil and gas installation:

Full geometry of the wells in terms of pipe position in the wells

Relevant decision related with cement operations in between pipes can be achieved Bonded over free double pipe information can be extracted for a given intervals as long as a free pipe interval is logged.

More information about well integrity multiple pipe monitoring

Overburden logging using ultrasonic scanner

Use of existing proven logging technology

Short time delivery from logging time to results time.

Basement for decision on depth of cutting and pulling pipe for P&A

Basis for decisions on the amount of pipes to be left in the hole

Basis for decisions on mobilization equipment to the rigs

Monitoring of shallow intervals of the well

50% cost reduction for logging operations by not having to remove the inner pipe from the holes.

Operational decision for buckled pipe removal through BOP's

The invention claimed is:

1. A method of evaluation of a downhole installation, wherein the downhole installation includes a first pipe layer, a second pipe layer about the first pipe layer, an annulus between the first pipe layer and the second pipe layer, and a geological formation outside of the second pipe layer, the method comprising:

exciting a flexural wave in the first pipe layer using an angled acoustic transmitter;

exciting the first pipe layer and the second pipe layer with full waveform excitation;

thereby generating Lamb wave vibrations in both the first pipe layer and the second pipe layer;

receiving third interface echo data using a plurality of angled acoustic receivers at different locations along the longitudinal extent of the pipe layers;

receiving the acoustic response wave field generated by the Lamb wave excitation;

identifying a suitable component of the acoustic response wave field as being representative of the material state behind the second pipe layer;

determining, based on the amplitude of the identified component and a suitable threshold value, if the material outside the second pipe layer is fluid or solid; and analyzing the third interface echo data in light of the determined material state in order to thereby evaluate material conditions in the annulus outside the second pipe layer.

2. A method as claimed in claim 1, wherein the step of generating acoustic resonance across the thickness of the first pipe layer and the second pipe layer by use of full waveform acoustic excitation includes the use of ultrasonic pulse echo measurements with a near normal incidence on the pipe wall or full borehole acoustic mode measurement.

3. A method as claimed in claim 1, wherein the step of identifying a suitable component of the acoustic response wave field as being representative of the material state behind the second pipe layer includes identification of a number of the most energetic components of the wave field and selecting a suitable component.

4. A method as claimed in claim 3, wherein the third most energetic component is selected as the component of the acoustic response wave field that is used for determining the nature of the material behind the second pipe layer.

5. A method as claimed in claim 1, wherein the acoustic data from the third interface echo and full waveform measurements is analyzed in order to obtain one or more of the following: azimuthal ultrasound radii and eccentricity, azimuthal amplitude map at the near receiver, azimuthal amplitude map at the far receiver, attenuation for the third interface echo, the arithmetic mean of azimuthal amplitudes of the third interface echo, amplitudes of the five most energetic components of the acoustic wave fields, phase velocities of the five most energetic components of the acoustic wave fields, azimuth of the five most energetic components of the acoustic wave fields.

6. A method as claimed in claim 1 being used for assessment of the quality of the bond for sealing material formed around a downhole casing in an oil and/or gas installation.

7. A computer program product comprising instructions that, when executed, will configure a computer apparatus to implement a method comprising:

receiving acoustic data for a downhole installation that comprises: a first pipe layer, a second pipe layer about the first pipe layer, an annulus between the first pipe layer and the second pipe layer, and a geological formation outside of the second pipe layer;

wherein the acoustic data comprises third interface echo data received by a plurality of angled acoustic receivers at different locations along the longitudinal extent of the pipe layers and resulting from an acoustic wave oblique to the first pipe layer, and the acoustic data also comprises an acoustic response wave field generated by Lamb wave vibrations of the first pipe layer and the second pipe layer, the Lamb wave vibrations being obtained by use of full waveform acoustic excitation along with the oblique acoustic wave;

identifying a suitable component of the acoustic response wave field as being representative of the material state behind the second pipe layer;

determining, based on the amplitude of the identified component and a suitable threshold value, if the material outside the second pipe layer is fluid or solid; and analyzing the third interface echo data in light of the determined material state in order to thereby evaluate material conditions in the annulus outside the second pipe layer.

8. A system for evaluation of a downhole installation, wherein the downhole installation includes a first pipe layer, a second pipe layer about the first pipe layer, an annulus between the first pipe layer and the second pipe layer, and a geological formation outside of the second pipe layer, the system comprising:

a logging tool or tools for deployment within the first pipe layer in order to excite a flexural wave in the first pipe layer using an angled acoustic transmitter, receive third interface echo data using a plurality of angled acoustic receivers at different locations along the longitudinal extent of the pipes, generate Lamb wave vibrations across the thickness of the first pipe layer and the second pipe layer by use of full waveform acoustic excitation along with the excitation from the angled acoustic transmitter, and receiving an acoustic response wave field generated by the Lamb wave vibrations; and a processor arranged to, based on the third interface echo and response wavefield:

identify a suitable component of the acoustic response wave field as being representative of the material state behind the second pipe layer;

determine, based on the amplitude of the identified component and a suitable threshold value, if the material outside the second pipe layer is fluid or solid; and analyze the third interface echo data in light of the determined material state in order to thereby evaluate material conditions in the annulus outside the second pipe layer.

9. A downhole installation equipped with the system of claim 8.

* * * * *